United States Patent
Eminger et al.

(10) Patent No.: US 6,336,472 B1
(45) Date of Patent: Jan. 8, 2002

(54) PIPE REPAIR AND REPLACEMENT APPARATUS AND METHOD

(75) Inventors: Mark E. Eminger; Mikhail German, both of Warwick, RI (US)

(73) Assignee: Mark Eminger, RI (US)

( * ) Notice: Subject to any disclaimer, the term of this patent is extended or adjusted under 35 U.S.C. 154(b) by 0 days.

(21) Appl. No.: 09/711,958

(22) Filed: Nov. 15, 2000

Related U.S. Application Data

(60) Provisional application No. 60/166,172, filed on Nov. 18, 1999.

(51) Int. Cl.$^7$ ................................................ F16L 55/16
(52) U.S. Cl. .......................... 138/99; 138/97; 138/99; 137/15.08; 264/152
(58) Field of Search ................... 138/99, 97; 264/152, 264/15.11; 137/318, 15.08

(56) References Cited

U.S. PATENT DOCUMENTS

| | | | |
|---|---|---|---|
| 4,049,480 A | * | 9/1977 | Kutschke .................. 138/99 X |
| 4,508,130 A | * | 4/1985 | Studer et al. ............. 138/99 X |
| 4,673,122 A | * | 6/1987 | Dubey ...................... 138/99 X |
| 4,732,412 A | * | 3/1988 | Van Der Linden et al. ............ 138/99 X |
| 5,577,528 A | * | 11/1996 | Saha et al. ........... 137/15.08 X |
| 5,853,030 A | * | 12/1998 | Walding ..................... 138/99 |

* cited by examiner

Primary Examiner—Patrick Brinson
(74) Attorney, Agent, or Firm—W. Warren Taltavull; Manelli Denison & Selter PLLC

(57) ABSTRACT

A pipe replacement apparatus includes a housing having upper and lower walls that are sealed together about a pipe section to be replaced; on the interior surfaces of the walls, tracks are provided for clamps with engage the original pipe and also carry the replacement section; cutting devices are provided operable through one of the walls to sever the original pipe and the clamps are gear driven to be shiftable to move the cut portion out of line and move the replacement section into line; sealing collars are carried on the replacement pipe portion and manipulated to engage the pipe portions to be sealed thereto.

8 Claims, 8 Drawing Sheets

PIPE REPAIR AND REPLACEMENT APPARATUS AND METHOD

This application claims benefit of provisional application No. 60/166,172, filed Nov. 18, 1999

FIELD OF THE INVENTION

The present invention relates to an apparatus and method for in-line cutting and replacement of a plastic pipe section particularly where the fluid being carried in the pipe must be maintained for supply to the user and, more specifically, to an arrangement for protecting the operators of the apparatus from contact with the fluid being conveyed.

BACKGROUND OF THE INVENTION

In many commercial, municipal and industrial environments, plastic pipe conduits used to convey fluids to a site inevitably require repair, modification or replacement sometimes after many years of use. Such pipes are typically made from a thermoplastic polyvinylcholoride (PVC), polyethylene or other plastic formulations. Where the fluids being conveyed are flammable, at high temperatures or pressures and where the end user cannot tolerate any significant down time to shut-off of the flow through a conduit, the prior art has endeavored to provide in-line replacement and repair devices which bypass the section of the pipe being replaced or repaired temporarily with a bypass housing that typically includes an upstream connector and a downstream connector which enable operators to bypass a section of pipe while work is done. Such devices, however, present several disadvantages in use. First among these are the time required to install and then remove the bypass housing. Also, many of these housings have been difficult to set in place due to their size and effective sealing of the housing to assure worker safety has been a problem due in some respects to the rough handling of these devices in the field.

SUMMARY OF THE INVENTION

The present invention overcomes the foregoing as well as other difficulties in the prior art by providing an improved housing which an be easily handled by even an untrained crew and easily set in place to carry out a pipe repair or replacement operation. In one embodiment, a sealable housing is provided in two parts. One part is mounted about the pipe section to be replaced and also carries sealing elements and manipulating elements as well as a substitute pipe section. With the housing closed in a sealed manner, pipe cutters, carried on one of the housing parts are activated to cut the original pipe section at two locations in the sealed housing. A pipe shifting device carried in the housing is then shifted laterally to bring the new pipe section into alignment with the two cut ends of the original pipe line. The manipulating elements are then activated to move the two sealing collars outwardly to engage the cut ends of the original pipe line. Sealing of the collars respectively to the two cut ends of the original pipe line is then effected. In a preferred method, this is accomplished by supplying electrical current to two resistance wires embedded in the collars so as to heat the collars to a temperature sufficient to provide a plastic flow to achieve a seal between each collar and the engaged cut end of the original pipe upon cooling of the collar material. It will be understood, of course, that other sealing techniques may be employed.

It will be understood that the apparatus of the present invention can be operated without interrupting flow from the source to the user by virtue of the use of the sealed housing which is operable without external interference. Also, the replacement operation can be carried out independent of the orientation of the housing thus facilitating replacements in difficult terrain.

The foregoing and other advantages will become apparent as consideration is given to the following description taken in conjunction with the accompanying drawings, in which.

DETAILED DESCRIPTION OF THE INVENTION

Figure 1:
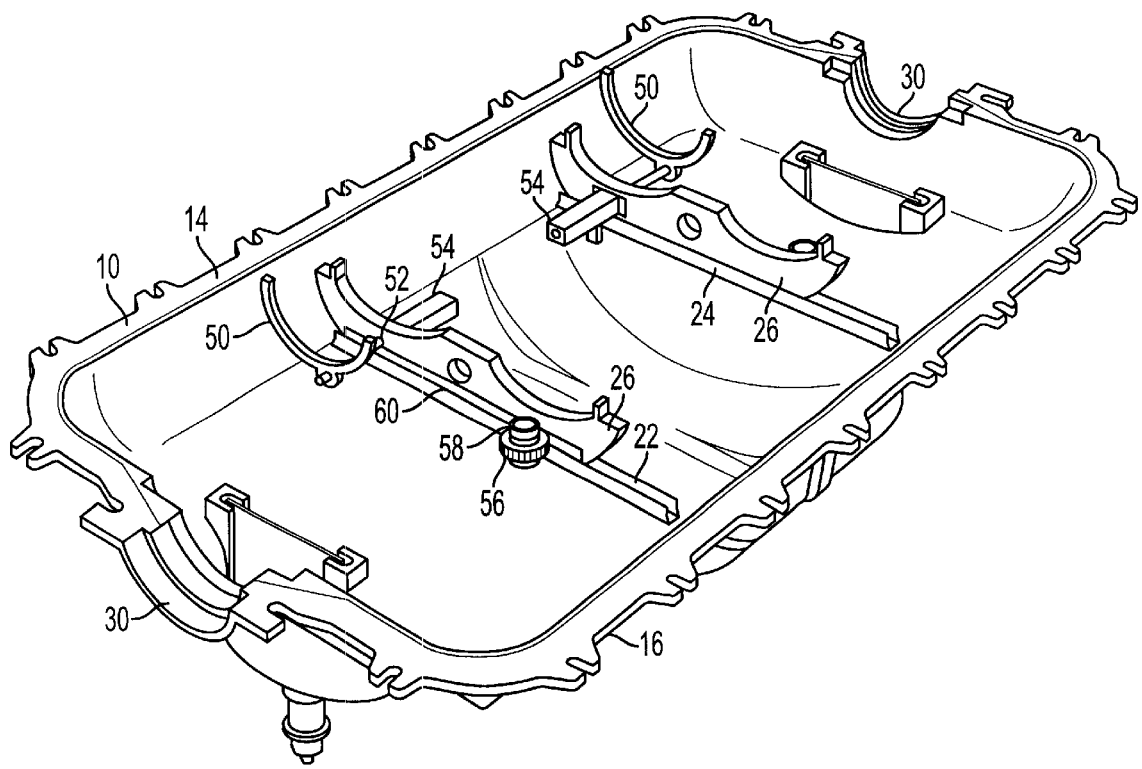
FIG. 1 is a perspective view and of one portion of the housing showing the interior thereof.
Figure 2:
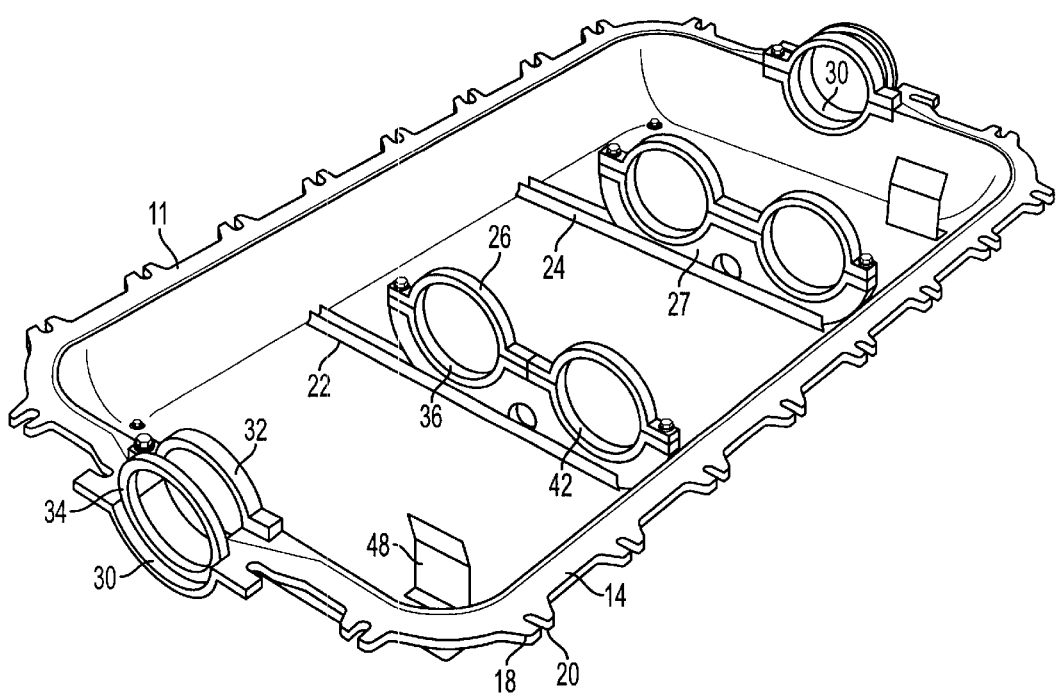
FIG. 2 Is a Perspective View of the Other Portion of the Housing Showing the Interior Thereof.
Figure 5:
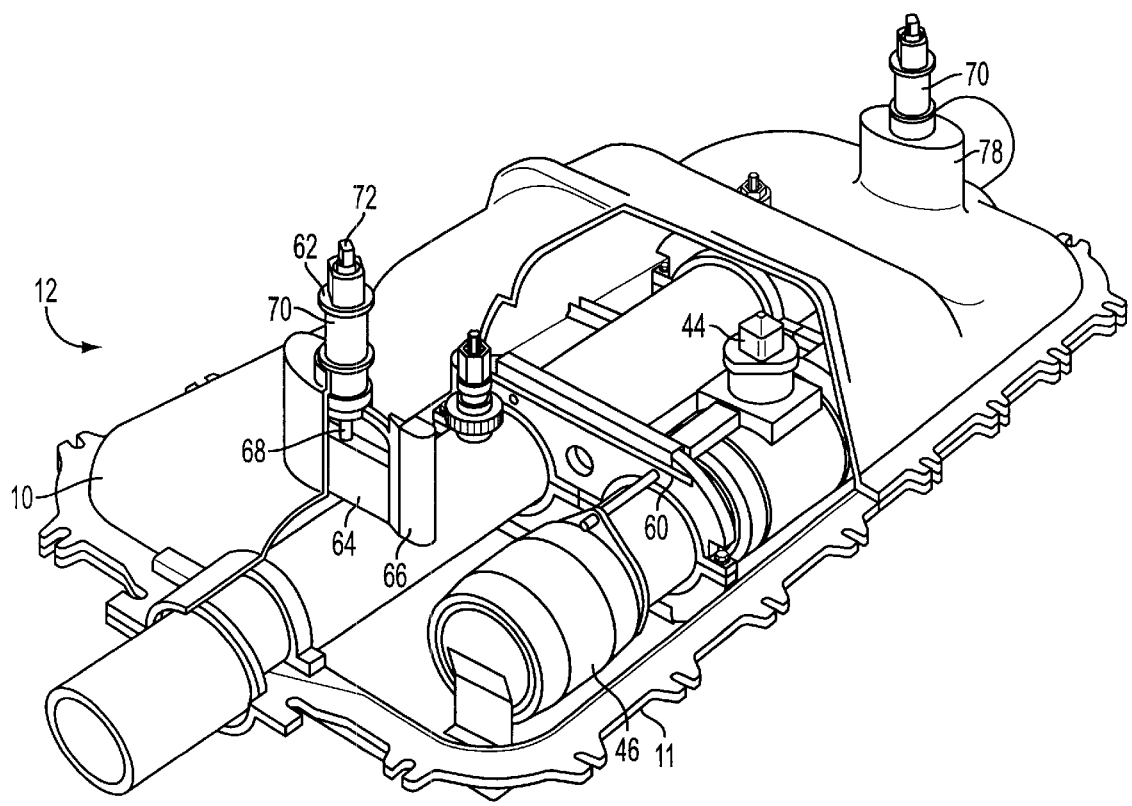
FIG. 5 is a perspective view with parts broken away of the two housing portions sealed together prior to a cutting operation.

Referring to the drawings wherein like numerals designate corresponding parts throughout the several views, there is shown in FIGS. 1 and 2, a pipe segment repair and replacement apparatus which comprises a first wall 10 and a second wall 11 which when joined together define a housing 12 (FIG. 5). Each wall 10 and 11 is formed with a curved outer or side wall portion and with a peripheral flange between which a sealing gasket 16 is placed so that when the walls are joined together an effective seal will be provided preventing fluid leakage. To effect the seal, a plurality of slotted tongues 16 and 18 are provided evenly spaced about and extending outwardly from the flanges 14 of each wall 10 and 11. Threaded bolts and nuts will be employed as is conventional to secure the walls 10 and 11 together by placing the bolts across the slots 20 and tightening the nuts. The interior of each wall is provided with spaced apart tracks 22 and 24 which may be bolted or welded in place so that the tracks 22 and 24 of one wall will be in alignment with the respective tracks 22, 24 of the other wall.

Figure 3:
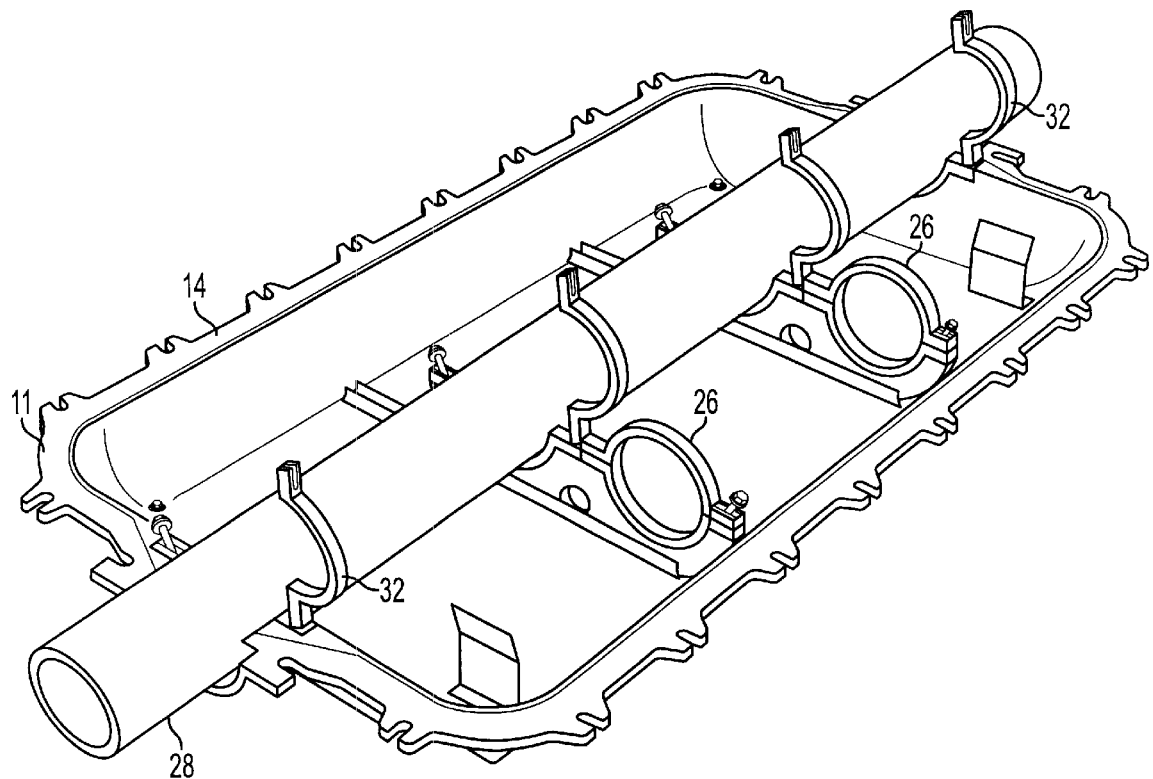
FIG. 3 is a view similar to FIG. 2 but with a 4 inch plastic pipe positioned in the housing portions.
Figure 4:
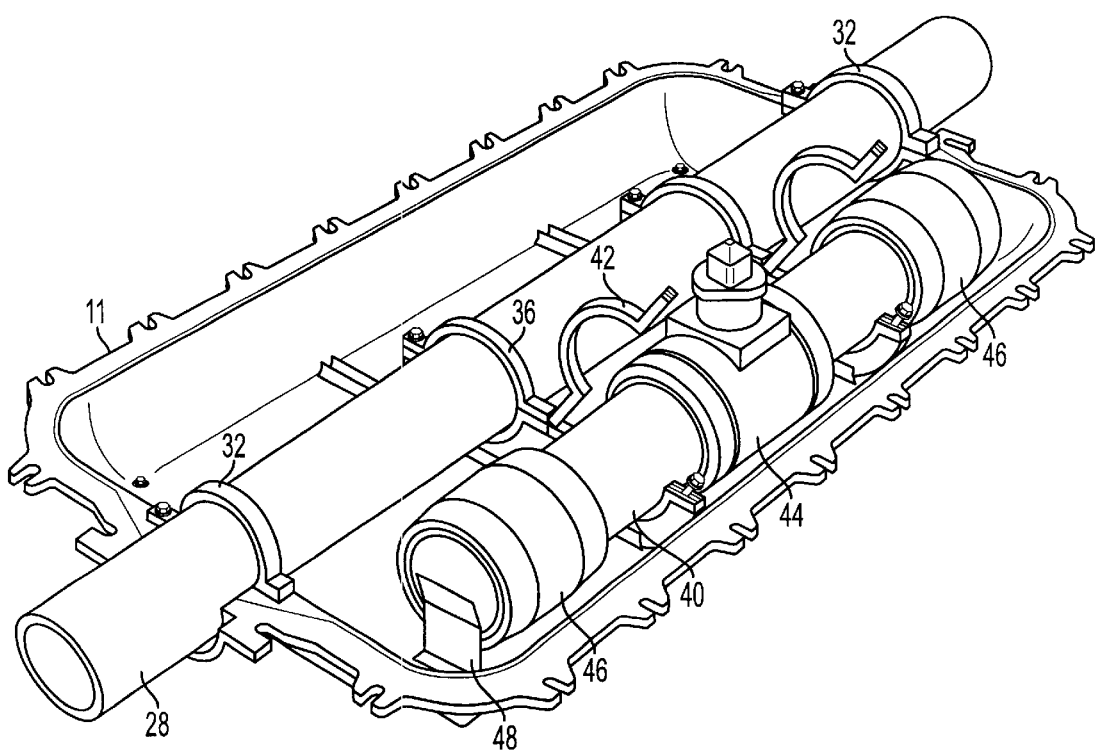
FIG. 4 is a view similar to FIG. 3 but with a replacement pipe section sealing collar disposed in the housing portion.

Dual opening pipe clamps 26, 27 are respectively carried in and movable along each of the aligned tracks 22 and 24 when the walls 10 and 11 are sealed closed. Prior to the closing, as shown in FIG. 3, the lower wall 11 of the housing 12 is placed beneath a pipe line 28, with the pipe line 28 passing through a recesses 30 at each end of the wall 11 and adjacent to which is a clamp 32 which is then bolted in a closed position. A split seal 34 will be wrapped around the pipe portion in the recess 30 as well as at the opposite end of the wall 11 which is identically configured and equipped. The pipe line 28 will also be placed in one of the openings 36 of each of the clamps 26, 27. A replacement pipe section 40 is placed in the other opening 42 of the clamps 26, 27. In the illustrated form, the replacement pipe section includes a shut-off valve 44. Each end of the pipe section 40 is surrounded by a sealing collar 46 both of which are slidable relative to the pipe section. To retain the collars 46 in position during the installation operation, a plate 48 is provided extending upwardly from the wall 11 for each end of the pipe section 40.

With reference to FIG. 1, there is shown the collar manipulating device in the form of a U-shaped bracket member 50 for each upper clamp portion 26 of the upper wall 10. Each bracket member 50 is attached to a movable bar 52. In their retracted positions, the bars 50 are each partially housed in a case 54 which is mounted on the side of the upper clamp portion 26 opposite to the location of the bracket member 50. The bars 52 are serrated or notched to cooperate with the teeth of a gear wheel 56 mounted on an inner pin that extends through the wall 10 to allow rotation to be imparted externally of the housing 12. Also, a translation gear 58 is mounted on a concentrically disposed pin to allow rotation independent of the first pin that operates the gear wheel 56.

Figure 6:
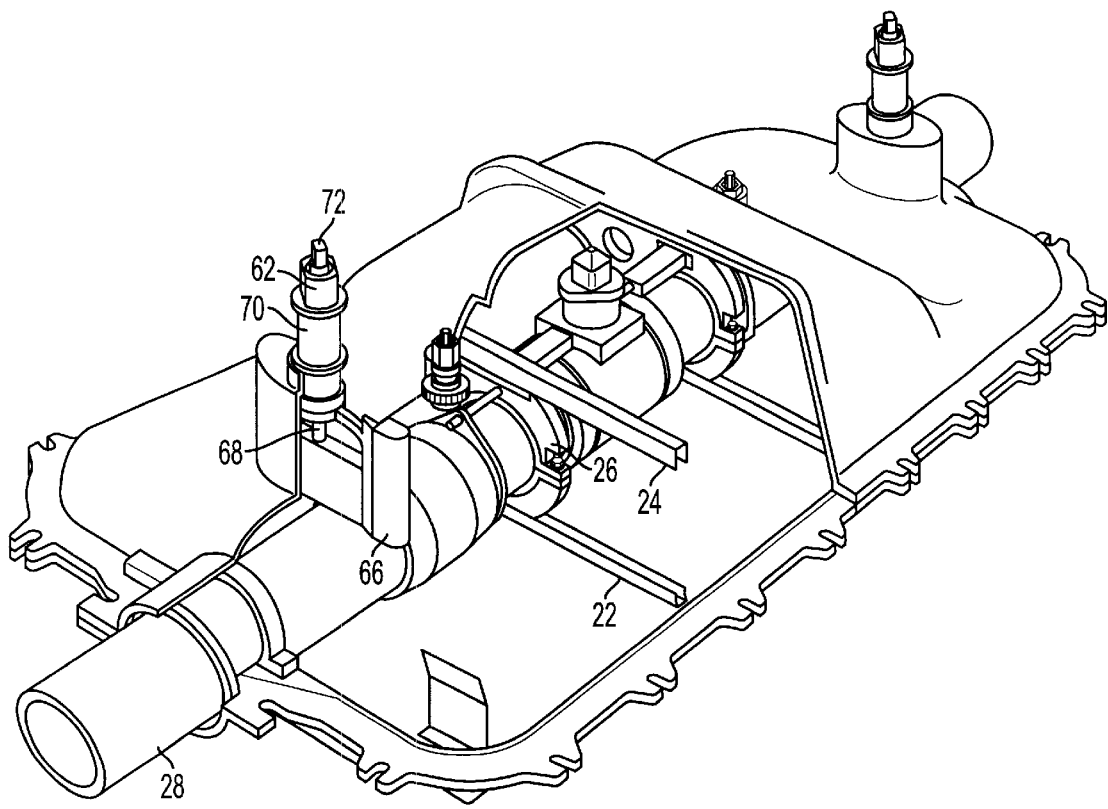
FIG. 6 is a perspective view with parts broken away showing the disposition of the replacement pipe section after a cutting operation.

The translation gear 58 operates on a toothed bar or plate 60 mounted on each clamp portion 26. Referring to FIG. 6, the length of the bar 60 is such that, upon rotation of the translation gear 58, the associated clamp 26 will be translated to the left until the gear wheels 56 engage bars 52. The other translation gear will be rotated substantially synchronously with the first mentioned translation gear 58. With the gear wheel 56 engaged and rotated, the U-shaped bracket member 50 will be moved away from the clamp 26 to engage the end of the collar 46 and will effect sliding movement of the respective collars outwardly with respect to the ends of the replacement pipe section.

Figure 7:
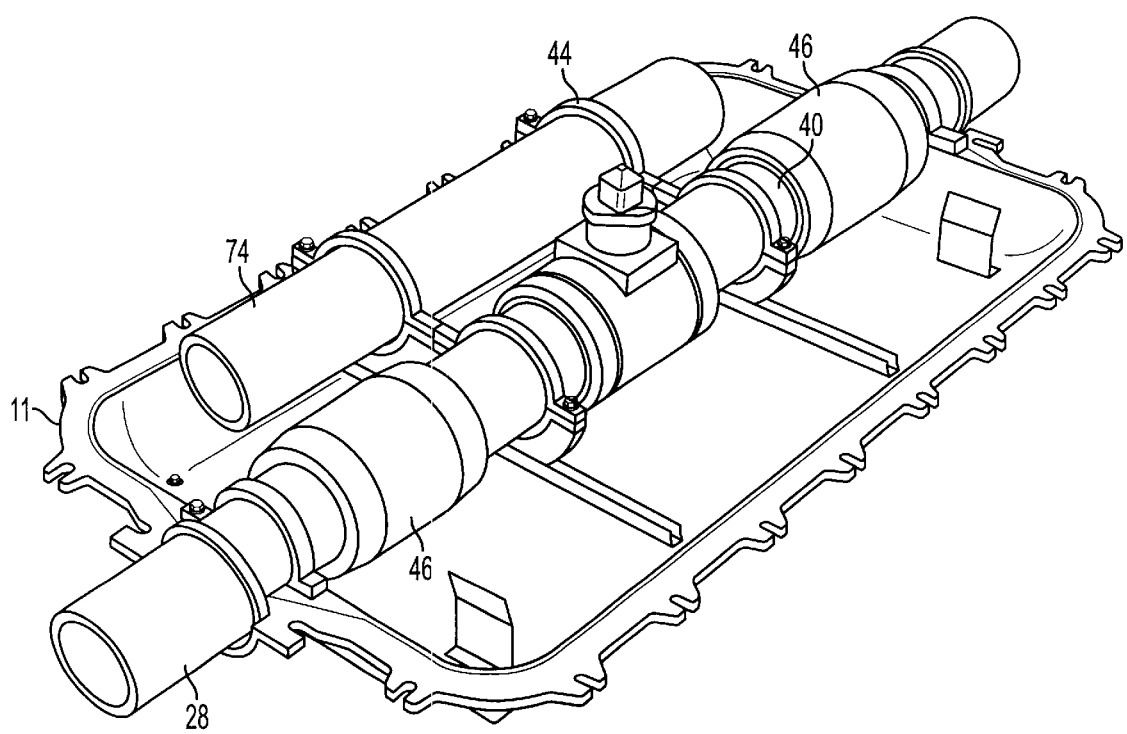
FIG. 7 is a perspective view after completion of the sealing operation and removal of the lower housing portion.
Figure 8:
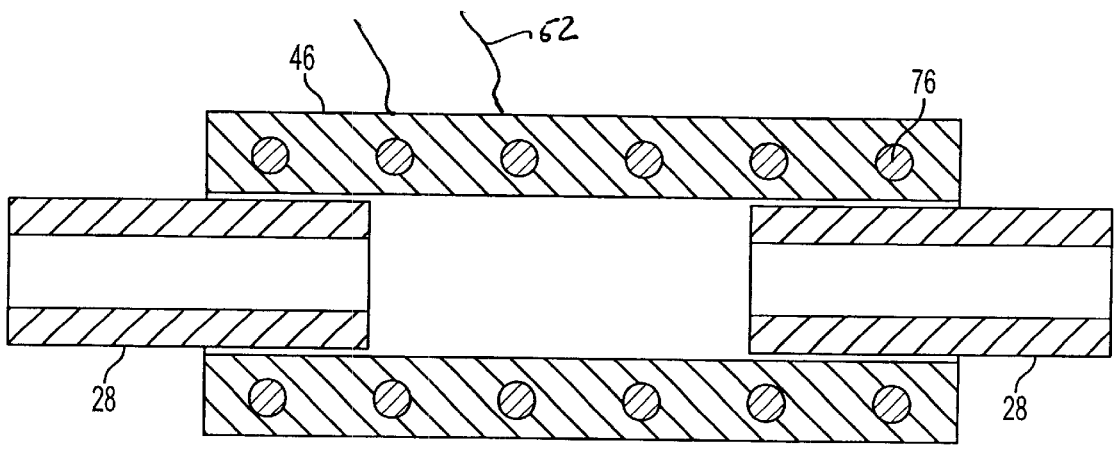
FIG. 8 is a schematic view of the coupling collar useful with the invention.

As shown in FIG. 5, the wall 10 is provided with two cutting devices 62 one adjacent each end of the housing 12. The devices 62 each include a cutting blade 64, the sides of which are slidably supported in guides 66. Each blade 64 is attached to drive screw 68 which extends through a seal chamber 70 and terminates externally at 72. Once the housing 12 is sealed and with the original pipe line in aligned clamp openings and the replacement section similarly attached in the other openings of the clamps, cutting of the original pipe line is carried out. With the blades 64 withdrawn into cover housings 78, translation gear 58 is rotated (with gear wheel 56) to effect translation of the clamps 26, 27 to move the cut section 74 of pipe 28 to the left as viewed in FIG. 7 and simultaneously move the replacement section 40 into alignment with the now free ends of the original pipe line 28. Gear wheel 56 is then rotated again to move the brackets 50 against the ends of the respective collars 46 to cover the abutting ends of the pipe section 40 and original pipe 28. Each collar 46 will be made of a thermoplastic such as polyethylene and will have resistance wires 76 embedded therein as shown in FIG. 8. The wires will be connected through the wall of the housing 12 to a source of electrical current which when supplied will heat the plastic material of the collars to effect a bond between the interior surfaces of each collar and the underlying pipe ends.

From the foregoing description, it will be apparent that the orientation of the housing during installation and operation can be varied to suit the surrounding terrain as the housing, once installed on the pipe 28, can be operated in any angular rotational position. Thus, where terrain that is rocky or includes large portions of cement or other types of hard material is encountered, the user will have a range of positions to employ to carry out the replacement operation.

What is claimed is:

1. An apparatus for replacing a section of pipe in a pipe line comprising a housing having a first and a second wall each having peripheral joinable edges to define said housing with an interior space and with said walls each having an interior surface and an exterior surface, said first and second walls each having alignable sections for defining openings for receiving a pipe length which will extend through said housing between said openings when said walls are joined, said first and second walls each having a first and second pair of tracks with each pair of tracks mounted on said respective interior surfaces thereof and a pair of pipe clamping members mounted for movement on said tracks with one of said clamping members extending between a said track of said first pair on said first wall and a said track on said second wall and the other of said clamping members correspondingly extending between said tracks of said second pair, said tracks of each pair being aligned to permit substantially rectilinear movement of respective clamping members on said respective tracks, actuating members mounted on one of said walls for effecting movement of one of said clamps along two of said tracks between an in line position and an out of line position in said housing, said clamping members including a first pipe clamping portion and a second clamping portion for the replacement pipe section, said housing including pipe cutting members spaced apart from each other and actuatable through said housing to cut a pipe length clamped in said first pipe clamping portion of said clamping members.

2. The invention as claimed in claim 1 wherein a replacement pipe section is provided and has opposite ends, each end having a sealing collar mounted thereon for sliding movement relative to said respective end of said replacement pipe section.

3. The invention as claimed in claim 2 wherein said clamping members each has collar engaging arms operable by said actuating member when said clamping members are in said out of line position in said housing to move said respective collar past said respective end of said replacement pipe section.

4. The invention as claimed in claim 2 wherein said pipe, said replacement pipe section and said collars are made of a bondable plastic material, said collars each include heating conductors embedded therein and connectable to a source of current.

5. The invention as claimed in claim 4 wherein said plastic material is polyvinyl chloride.

6. The invention as claimed in claim 4 wherein said plastic material is polyethylene.

7. The invention as claimed in claim 2 wherein said interior surface of one of said walls includes plates for engaging said opposite ends of said replacement pipe section while in the out of line position in said housing.

8. A method of replacing a pipe section in a pipe using a pipe replacement section having opposite ends and a slidable collar on each end with the pipe replacement section and collars being made of thermoplastic material, using a pipe replacement apparatus of the type having a housing having a first and a second wall each having peripheral joinable edges to define said housing with an interior space and with said walls each having an interior surface and an exterior surface, said first and second walls each having alignable sections for defining openings for receiving a pipe length which will extend through said housing between said openings when said walls are joined, said first and second walls each having a pair of tracks mounted on said respective interior surfaces thereof and a pair of pipe clamping members mounted for movement on at least two of said tracks, an actuating member mounted on one of said walls for effecting movement of one of said clamps along two of said tracks, when said edges of said first and second walls are joined, between an in line position and an out of line position in said housing, said clamping members including a first pipe clamping portion and a second pipe clamping portion, said housing including pipe cutting members spaced apart from each other and actuatable through said housing to cut a pipe length clamped in said first pipe clamping portion of said clamping members, comprising the steps of:

placing a length of the pipe in the first pipe clamping portion in the housing and joining the first and second walls in a sealed manner with the second pipe clamping portion carrying the replacement pipe section, actuating the pipe cutting members to sever a length of the pipe that is clamped by the clamping members in the in line position and leave severed ends of the pipe exposed, actuating the actuating member to move the pipe length in the clamping members along said tracks from the in line position to the out of line position while moving the replacement pipe section to the in line position, sliding the collars outwardly with respect to the ends of the replacement pipe section to overlie the severed ends of the pipe, applying heat to the collars to bond the collars to the replacement pipe section and about the ends of the severed pipe.

\* \* \* \* \*